US011255769B2

(12) United States Patent
Knoll et al.

(10) Patent No.: US 11,255,769 B2
(45) Date of Patent: Feb. 22, 2022

(54) UP-CONCENTRATION AND SIZE SORTING OF NANOPARTICLES IN MICROFLUIDIC DEVICES

(71) Applicant: International Business Machines Corporation, Armonk, NY (US)

(72) Inventors: Armin Knoll, Adliswil (CH); Francesca Ruggeri, Zurich (CH); Christian Michael Schwemmer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 16/528,751

(22) Filed: Aug. 1, 2019

(65) Prior Publication Data

US 2021/0033517 A1 Feb. 4, 2021

(51) Int. Cl.
*B01L 3/00* (2006.01)
*G01N 15/10* (2006.01)
*B07B 1/00* (2006.01)

(52) U.S. Cl.
CPC .......... *G01N 15/10* (2013.01); *B01L 3/50273* (2013.01); *B01L 3/502753* (2013.01); *B01L 3/502761* (2013.01); *B07B 1/00* (2013.01); *B01L 2200/0652* (2013.01); *B01L 2300/0681* (2013.01); *B01L 2300/0851* (2013.01); *G01N 2015/1081* (2013.01); *G01N 2015/1087* (2013.01)

(58) Field of Classification Search
CPC .......... B01L 3/50273; B01L 3/502753; B01L 3/502761; B01L 3/5027; B01L 2200/0652; B01L 2300/0851; B01L 2400/0415; B07B 1/00; G01N 15/149; G01N 15/10

USPC ........................................ 209/235; 435/2, 30
See application file for complete search history.

(56) References Cited

U.S. PATENT DOCUMENTS

| 6,193,866 B1* | 2/2001 | Bader ............... G01N 27/44773 |
| | | 204/450 |
| 9,625,454 B2* | 4/2017 | Strey ................. G01N 33/54366 |
| 9,937,498 B2* | 4/2018 | Yobas .............. G01N 27/44791 |

(Continued)

FOREIGN PATENT DOCUMENTS

| CA | 2 966 603 A1 | 5/2016 | |
| WO | WO-2013116696 A1 * | 8/2013 | ............... B07B 7/00 |

OTHER PUBLICATIONS

P. Sajeesh, Ashis Kumar Sen, Nov. 11, 2013, Springer-Verlag Berlin Heidelberg, (Year: 2014).*

(Continued)

*Primary Examiner* — Gene O Crawford
*Assistant Examiner* — Muhammad Awais
(74) *Attorney, Agent, or Firm* — Harrington & Smith

(57) ABSTRACT

A microfluidic device includes: a microchannel defining a flow path; a Brownian motor structure comprising two or more sorting channels having distinct ratchet topographies, the Brownian motor structure in fluid communication with the microchannel; and a filter extending transversely to the microchannel, the filter configured to filter particles, subject to sizes thereof, in a liquid advancing along the flow path, whereby smaller particles of the liquid can pass downstream of the filter in the flow path, and larger particles of the liquid are directed to the Brownian motor structure to be sorted out according to sizes thereof via the sorting channels.

20 Claims, 4 Drawing Sheets

(56) References Cited

U.S. PATENT DOCUMENTS

| | | |
|---|---|---|
| 10,058,895 B2 * | 8/2018 | Astier ................ G01N 30/6095 |
| 10,232,370 B2 * | 3/2019 | Fringes ................ B01D 61/427 |
| 2007/0125941 A1 * | 6/2007 | Lee .................. B01L 3/502761 |
| | | 250/251 |
| 2013/0175171 A1 | 7/2013 | Aizel et al. |
| 2019/0336898 A1 * | 11/2019 | Chen ..................... B01D 45/16 |

OTHER PUBLICATIONS

Haramoto, Eiji, et al., "A review on recent progress in the detection methods and prevalence of human enteric viruses in water", Water Research 135, (2018), pp. 168-186.

* cited by examiner

UP-CONCENTRATION AND SIZE SORTING OF NANOPARTICLES IN MICROFLUIDIC DEVICES

BACKGROUND

The exemplary embodiments described herein relate, in general, to techniques to concentrate and sort particles (e.g., nanoparticles such as viruses) and, in particular, to microfluidic devices equipped with Brownian motors to sort such particles.

Enteric viruses and other viruses are frequently found in drinking water. It has been shown that between 1 and 10 virions (i.e., virus particles) can, in some cases, be sufficient to cause an infection. Ultra-dilute species cannot be easily detected due to limits imposed by diffusion and residence time within the sensor. Standard detection methods (e.g., virus adsorption-elution methods, also known as Viradel methods) utilize physical absorption of viruses at charged interfaces and subsequent elution, up-concentration and quantitative polymerase chain reaction (qPCR) detection of viral DNA. Such methods require long detection time (on the order of days). Moreover, such methods are typically sensitive to contamination. A review on recent progress in the detection methods and prevalence of human enteric viruses in water is for instance given in E. Haramoto et al. *Water Research* 135 (2018) 168-186.

More generally, many detection methods of nanoparticles have been proposed, which notably rely on microfluidic techniques. Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at such scales. Flow of liquids in microfluidics is typically laminar. Microfluidic devices generally refer to microfabricated devices, which are used for pumping, sampling, mixing, analyzing and dosing liquids. Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned inside or across microchannels of the device. Microfluidics has opened the door for applications in many areas of healthcare and life sciences, such as point-of-care diagnostics (POCDs), environmental analysis, and drug discovery.

Quite unrelated, artificial Brownian motors have been proposed for selective particle transport using an asymmetric energy landscape and non-equilibrium fluctuations. Such Brownian motors may exploit isotropic diffusion and a periodically generated, asymmetric trapping potential to transport micron-scale particles. The required potentials are typically obtained using optical or dielectrophoretic forces, which scale with particle volume and are therefore not necessarily efficient at the nanoscale. While flashing ratchet topographies rely on diffusion, designs of rocking ratchet topographies have been proposed, which may generate directed particle motion based on a fluctuating external force and a static potential landscape. Moreover, rocking ratchets were proposed for nanoscale particles, which rely on strong and reliable static energy landscapes.

SUMMARY

According to one aspect, a microfluidic device comprises a microchannel, a Brownian motor structure, and a filter. The microchannel defines a flow path for a liquid. The Brownian motor structure comprises two or more sorting channels having distinct ratchet topographies. The Brownian motor structure is in fluid communication with the microchannel. The filter extends transversely to the microchannel. The filter is configured to filter particles (subject to sizes thereof) in a liquid advancing along the flow path. This way, smaller particles of the liquid can pass downstream of the filter (in the flow path), whereas larger particles of the liquid are directed to (e.g., electrostatically deflected toward) the Brownian motor structure to be sorted out (according to sizes thereof) via the sorting channels, in operation of the device.

According to another aspect, a method of sorting particles according to their sizes involves a microfluidic device such as described above. According to this method, a liquid that contains particles is introduced in the microchannel. As the liquid advances along the flow path, particles in the liquid are filtered by the filter, subject to their sizes, such that smaller particles of the liquid pass downstream of the filter in the flow path, whereas larger particles of the liquid are directed to the Brownian motor structure. Moreover, an oscillating electric field is applied across the sorting channels for the larger particles to be sorted out according to sizes thereof, via the sorting channels. The sorted particles can for instance be collected from reservoirs in fluid communication with the sorting channels. The method is preferably carried out so as to collect viruses having average sizes between 20 nm and 100 nm.

Devices and methods will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
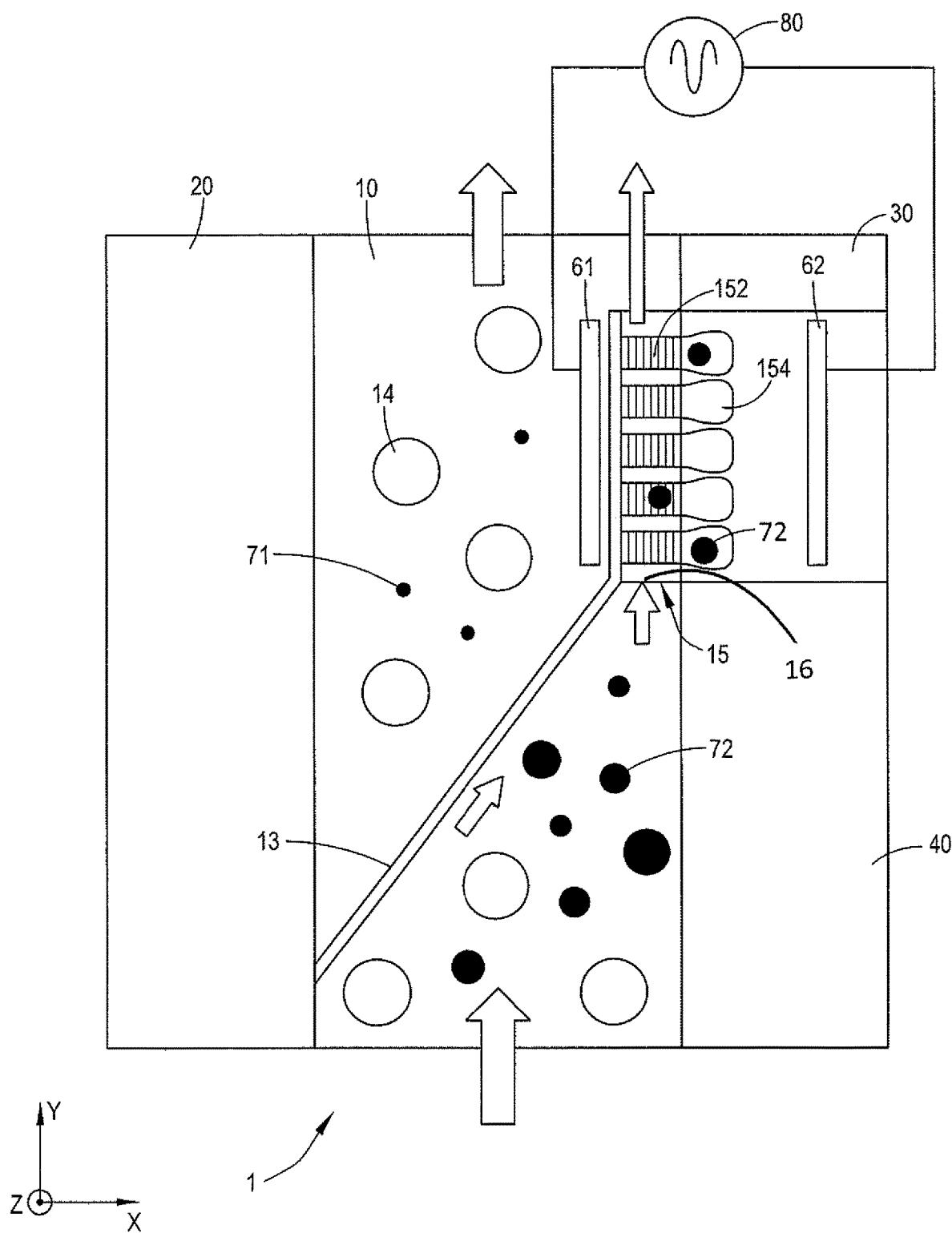
FIG. 1 is a top view of a device according to embodiments (it further illustrates steps performed in methods according to embodiments)

The accompanying drawings show simplified representations of the device or parts thereof, as involved in embodiments. Some components (e.g., lid, posts, voltage controller, electrodes) of the device are sometimes omitted, for the sake of depiction. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

In reference to FIGS. 1-4, one example embodiment is described, which concerns a microfluidic device 1.

The device 1 comprises a microchannel 10, also referred to as the "main channel" or "channel" herein. This channel 10 defines a flow path for a liquid meant to be introduced therein. The accompanying drawings show a straight section of this channel 10, which, as whole, may possibly have a more sophisticated profile. In the accompanying drawings, the flow path extends along axis y, which may be the main propagation direction of liquid introduced in this channel, in operation.

The device further includes a Brownian motor structure 15, which defines a sorting region meant to sort particles contained in the liquid. In particular, this region comprises two or more sorting channels 152, which have distinct ratchet topographies, as discussed herein.

The Brownian motor structure 15 is in fluid communication with the microchannel 10. In general, "fluid communication" between distinct microfluidic features of the device 1 means that a liquid flow path can be established between such features. Fluid communication may be achieved by way of channels, inlets, apertures (openings), wetting surfaces, capillary pumps, etc. In the example depicted in FIGS. 1-4, an aperture 16 is defined on a lateral side of the main channel 10, which allows liquid to access the sorting region 15.

The device also comprises a filter 12 formed at least in part by a barrier 13 and a lid 50. A component of this filter 12, namely, the barrier 13, extends transversely to the microchannel 10, i.e., across the plane (x, y). Various types of filter can be contemplated. The filter 12 is generally configured to filter particles, subject to sizes thereof, in the liquid advancing along the flow path (as depicted by arrows in FIG. 1). Part of the liquid will pass the filter 12, whereas a (smaller) part thereof will reach the sorting region 15, in operation, as indicated by arrows. Because of the filter 12, smaller particles 71 of the liquid can pass downstream of the filter in the flow path, whereas larger particles 72 are directed to the Brownian motor structure 15. There, such particles are sorted out (again, according to their sizes), due to the sorting channels 152, in operation.

The terminologies "larger particles" and "smaller particles" use relative terms, meaning that particles 71 having a size smaller than a threshold size will normally pass the filter 12, whereas particles 72 having a size larger than this threshold size will normally be directed to the Brownian motor structure 15.

The Brownian motor structure 15 may involve more than two sorting channels 152, e.g., three, four, or five channels 152 (as depicted in the accompanying drawings) or more, where at least two of the sorting channels 152 have distinct ratchet topographies. Preferably, each sorting channel 152 exhibits a distinct ratchet topography, in order to sort particles of different sizes. Such ratchets are dimensioned so as to provide sufficiently strong and reliable static energy landscapes, to facilitate the operation of rocking Brownian motors. Namely, the channels 152 are preferably formed so as to exhibit an upper wall that forms several contiguous steps having an asymmetric profile along the sorting direction (e.g., corresponding to the longitudinal direction) of the channel. That is, steps of each channel are designed to allow a step-by-step, linear motion of a nanoscale particle in only one direction, while preventing motion thereof in the opposite direction. A ratchet as used herein accordingly means a topography that allows or, at least, strongly favors a step-by-step motion in one direction only. To that aim, the teeth of the ratchet are oriented, e.g., with the shallow slope of the teeth facing the reservoirs 154, to urge particles toward the reservoirs 154, see FIG. 2A. The shallow slope angles of the steps may be more or less pronounced, though it will normally be small (e.g., less than 10°), as made possible with lithographic techniques discussed later. The baseline of the ratchet may possibly be inclined with respect to (x,y).

In order to power the rocking Brownian motor structures 15, the device 1 may further include one or more pairs of electrodes 61, 62 (see FIG. 1), integrated in the device 1. This way, the sorting channels 152 can be subject to an electro-osmotic flow generated by one or more AC voltages, respectively applied across the one or more pairs of electrodes. Note, one pair of elongated electrodes may be used, as depicted in FIG. 1. In variants, several pairs of electrodes can be relied upon. In other variants, the electrodes may be external, e.g., integrated in a housing shaped correspondingly with the device 1 and applied onto this device 1 to power the Brownian motors. Similarly, the voltage controller 80 may be provided on the device 1 or, preferably, as an external device, which can be connected to the electrodes 61, 62 via electrical connections (e.g., patterned electrical traces, not shown) and pads (e.g., patterned at an edge of the device 1, not shown).

The microfluidic structures are preferably patterned on a microfluidic chip, as depicted in FIGS. 1-4. In exemplary embodiments, the microchannel 10 and the ratchet topographies of the sorting channels 152 are closed on top, e.g., with the lid 50 (see FIG. 2A) such as a glass layer, in order to allow pressure to be applied to liquid introduced in the microchannel 10 and electrostatic effects to be exploited. However, the device 1 may be closed at a later fabrication stage. That is, the device may be shipped without any lid attached, and the lid could be affixed to the chip at a later stage, e.g., by the end user. This can be useful if the end user wishes to introduce reagents in the channel 10, for example, prior to sealing the structures 10, 15, 152, etc.

The substrate 11 of the device 1 may for instance comprise silicon and/or a thermally sensitive polymer, such as polyphthalaldehyde (PPA). Still, other materials can be contemplated. In particular, a pattern as initially obtained (e.g., by thermally patterning PPA) may be transferred to other materials, e.g., using dry etching. In general, suitable materials are materials such as oxides, which spontaneously charge in contact with water or other polar liquids. Examples of suitable materials include silicon oxide and aluminum oxide, which negatively and positively charge, respectively, under intermediate pH conditions.

Active or passive (i.e., capillary) pumps may further be involved. Preferably, external, active pumping means are used, so as to achieve a sufficient pressure for the liquid and, in turn, a desired extraction rate. Active pumping means may rely on a syringe.

The present solution allows particles of distinct average sizes to be continuously sorted via the rocking ratchets. The proposed approach notably allows a microfluidic device to be achieved, which can separate virions in sizes and thus enable detection of viruses, whose sizes are, e.g., between 20 and 100 nm, with a detection sensitivity below 1 aM and, this, in less than 1 hour in real-world conditions.

All this is now described in detail, in reference to particular embodiments of the invention. To start with, the filter 12 preferably comprises a slanted barrier 13, to deflect larger particles toward the sorting region of the Brownian motor structure 15. In detail, the microchannel 10 typically comprises a bottom wall extending in a reference plane P (see FIGS. 3 and 4). This plane is parallel to (x, y) in the accompanying drawings; it is typically located at an interface between the substrate 11 (e.g., a lower layer providing mechanical stability to the device) and an upper layer patterned so as to form the desired microfluidic structures.

Figure 4:
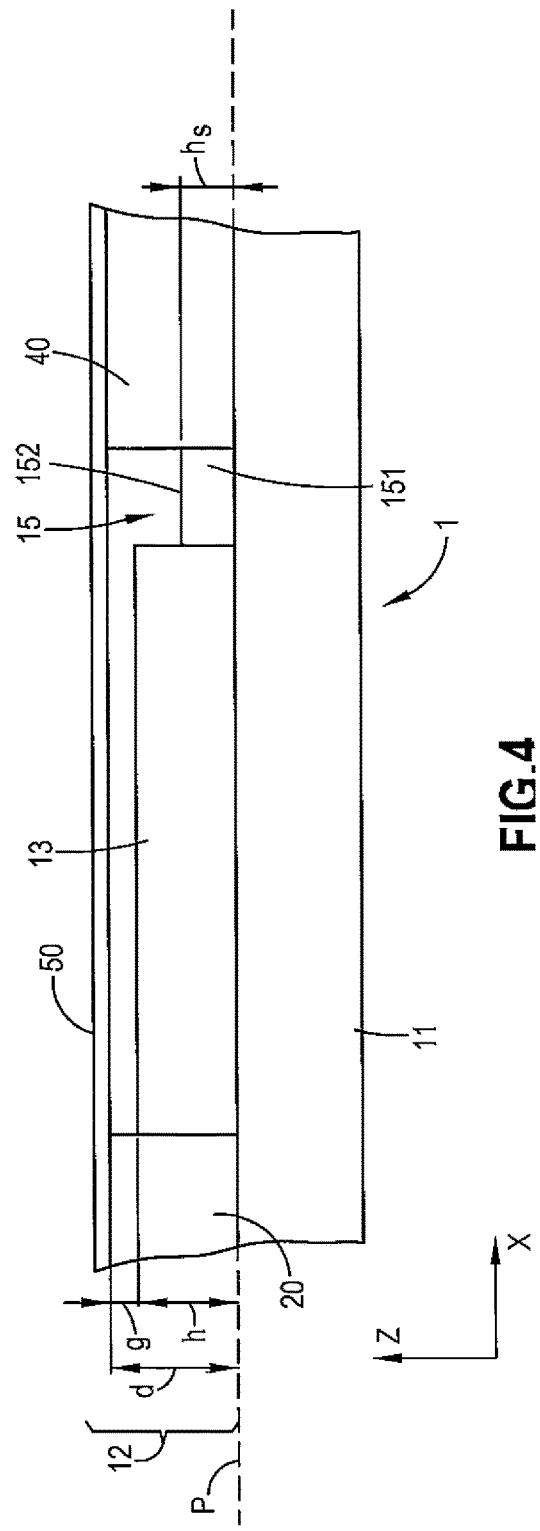
FIG. 4 is a front view of the device.

As seen in FIG. 4, the channel or microchannel 10 has an average depth d. The barrier 13 extends from the bottom wall of the microchannel 10, i.e., it protrudes vertically from the bottom wall of the microchannel 10. The barrier 13 is further inclined relative to the direction y of propagation of liquid defined by the flow path in the microchannel 10. That is, the barrier 13 forms an angle with axis y, which angle is neither 0° nor 90 (it is typically between 20° and 70, this depending on the desired flow rates and particles at stake).

The barrier 13 has an average height h, where h is strictly less than the depth d of the microchannel 10, so as to allow liquid to pass the barrier 13, even when the channel is closed on top. Note, h and d are, each, measured from the reference plane P, in the direction z, i.e., perpendicularly to the reference plane P. In other words, a small gap of height d−h is provided above the top surface of the barrier 13.

Once the device is closed with a lid 50 (e.g., glass), the barrier 13 forms, together with the lid 50, an electrostatic barrier. More precisely, the electrostatic barrier is formed by the barrier 13 and a portion of the lid 50 that faces the top surface of the barrier 13. The electrostatic barrier 13 with the lid 50 allows small particles to pass but electrostatically repels larger particles, which get deflected toward the sorting region. Although the barrier 13 may already contribute, mechanically speaking, to deflect larger particles 72 toward the sorting region, such particles 72 may in fact be essentially deflected due to electrostatic effects caused by the barrier 13 and the opposite portion of the lid 50.

In more details, the electrostatic potential in the microchannel 10 is essentially zero, owing to the relatively large dimension of d (and h). Particles approaching the physical barrier 13 experience a repulsive interaction potential ψ, which scales as $\exp(-\kappa(\rho_z - r))$, where $\kappa^{-1}$ is the Debye length (typically on the order of 10 to 30 nm), $\rho_z$ is the actual, vertical distance between a particle and the upper wall (lid) surface, and $\rho_z - r$ is the residual gap (surface-to-surface distance), which depends on the radius of the particle, r. As a rough estimate, for $r > \kappa^{-1}$, particles cannot be transported with liquid flowing across the barrier gap d−h, which is comparatively much smaller than h, but are rather diverted towards the sorting region of the Brownian motor structure 15, where the gap is larger.

In preferred embodiments, the height h of the barrier 13 is between 10 μm and 50 μm, while the size of the barrier gap g is between 50 nm and 200 nm. The total depth d of the microchannel 10 is equal to h+g, see FIG. 4.

Figure 3:
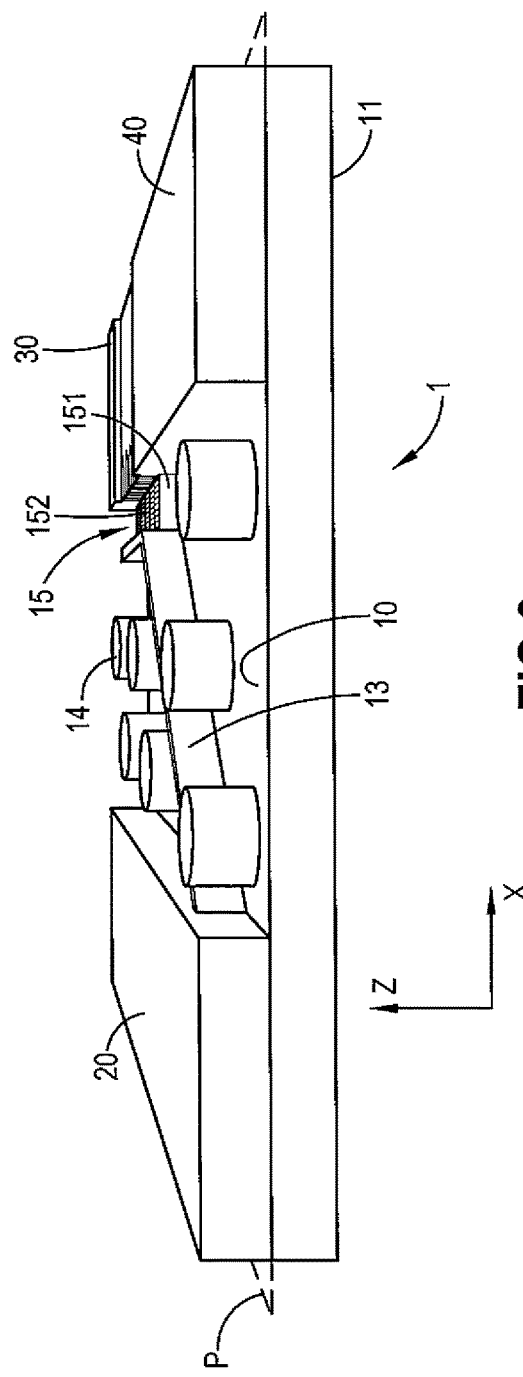
FIG. 3 is a perspective view of the device.

As illustrated in FIGS. 3 and 4, the average plane of the sorting channels 152 is preferably offset relative to the reference plane P, by a distance $h_s$. Like d and h, the distance $h_s$ is measured along axis z, from the reference plane P. The distance $h_s$ is nevertheless smaller than the height h of the barrier 13, i.e., $h_s < h < d$, such that the aperture of the sorting region of the Brownian motor structure 15 is larger than the residual gap above the barrier 13. For example, $h_s$ may be between 50 and 150 nm smaller than h. This, again, gives rise to electrostatic effects, which impose a maximal size on the particles allowed to enter the sorting region.

The sorting channels 152 are preferably processed on a mesa 151, itself patterned on the reference plane P. This way, the upper wall of each of the sorting channels 152 protrudes above the bottom wall of the microchannel 10, while being less high than the barrier 13. The barrier 13 preferably extends further along a lateral side of the sorting channels 152 (see FIG. 2A or 3), so as to laterally delimit a (small) channel, which defines the sorting region, i.e., the region where the sorting channels 152 are arranged.

Offsetting the sorting channels 152 with respect to the bottom wall of the main microchannel 10 provides an additional way of filtering particles according to their sizes. I.e., the step imposed by the mesa 151 imposes a limit to the upper sizes of the particles reaching the sorting channels 152. In that respect, because the largest particles may not be able to pass into the sorting region, an outlet (not shown) may be provided, upstream from the sorting region, to evacuate such particles toward a reservoir (not shown).

Note, the device 1 will preferably be designed so that the flow resistance of the sorting region (i.e., the region corresponding to the Brownian motor structure 15) is (much) larger than the flow resistance at the level of the barrier 13. As a result, the flow speed of liquid introduced in the microchannel 10 is (much) larger than the flow speed of liquid in the Brownian motor structure 15, which makes it possible to optimize the conditions in which particles get sorted in the sorting region. That is, most of the liquid passes over the barrier 13, while a gentle liquid flow reaches the sorting region, hence the benefits of electrostatic repulsion to deflect larger particles toward the sorting region of the Brownian motor structure 15. The liquid flow in the microchannel 10 and the sorting region of the Brownian motor structure 15 may typically differ by two orders of magnitude.

As seen in FIGS. 1-4, the sorting channels 152 preferably extend, each, parallel to the reference plane P. In these examples, the channels are arranged one after the other along axis y, which corresponds to the direction of propagation of the liquid in the sorting region of the Brownian motor structure 15. Note, the sorting channels 152 define respective sorting directions, along which particles are moved, in operation of the Brownian motor structure 15. The sorting directions of the channels 152 are preferably parallel to each other (parallel to axis x in the accompanying drawings) and furthermore parallel to the reference plane P. The sorting directions of the ratchets normally correspond to the longitudinal axes of the ratchets, which axes are preferably perpendicular to the direction y of propagation of liquid in the Brownian motor structure 15. This way, particles are sorted in a direction x where no net liquid flow exists. Moreover, because the flow direction in the sorting region is parallel to the flow direction in the main microchannel 10, a very compact structure can be obtained, with a reduced footprint.

Figure 2A:
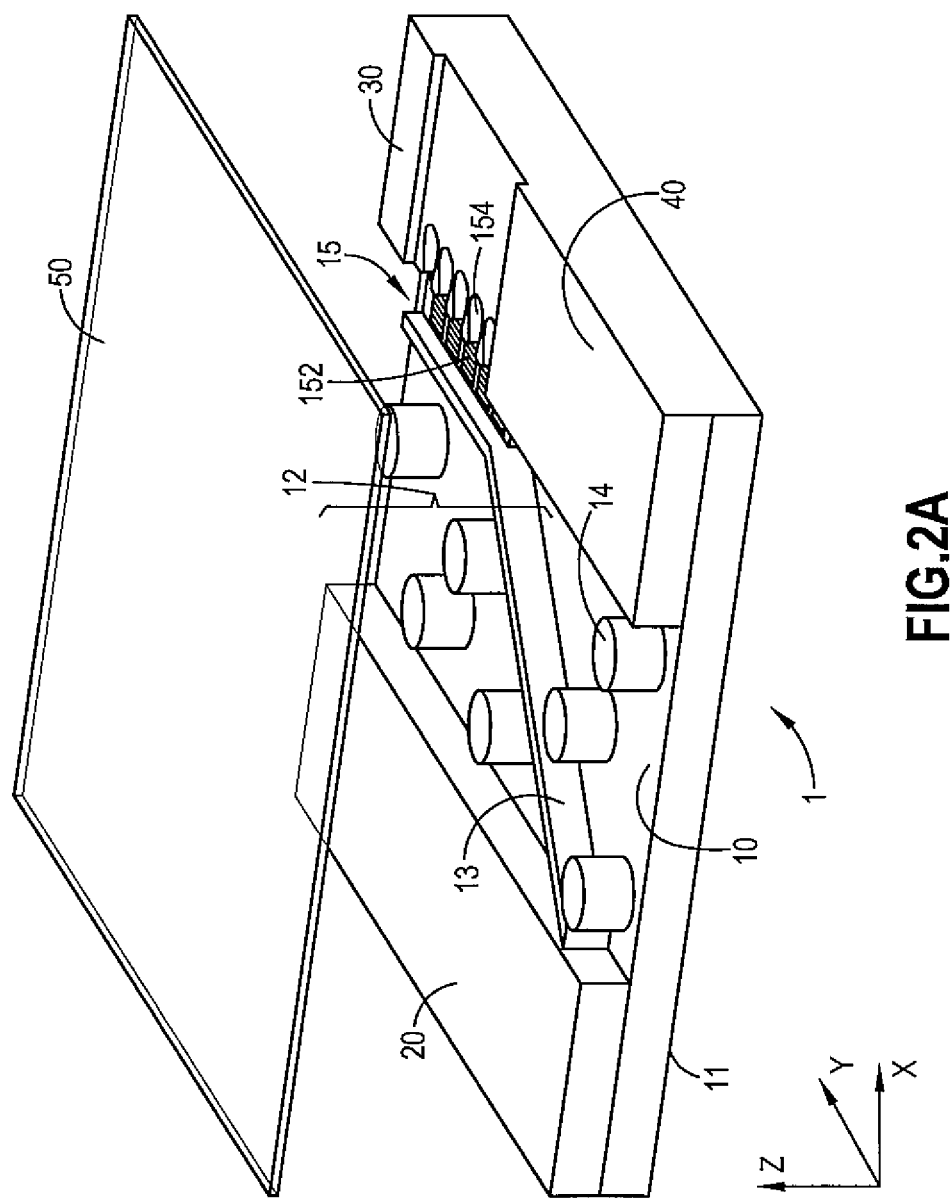
FIG. 2A is a three-dimensional partly exploded view of the device of FIG. 1, wherein the lid is separated from the microfluidic chip, for depiction purposes.
Figure 2B:
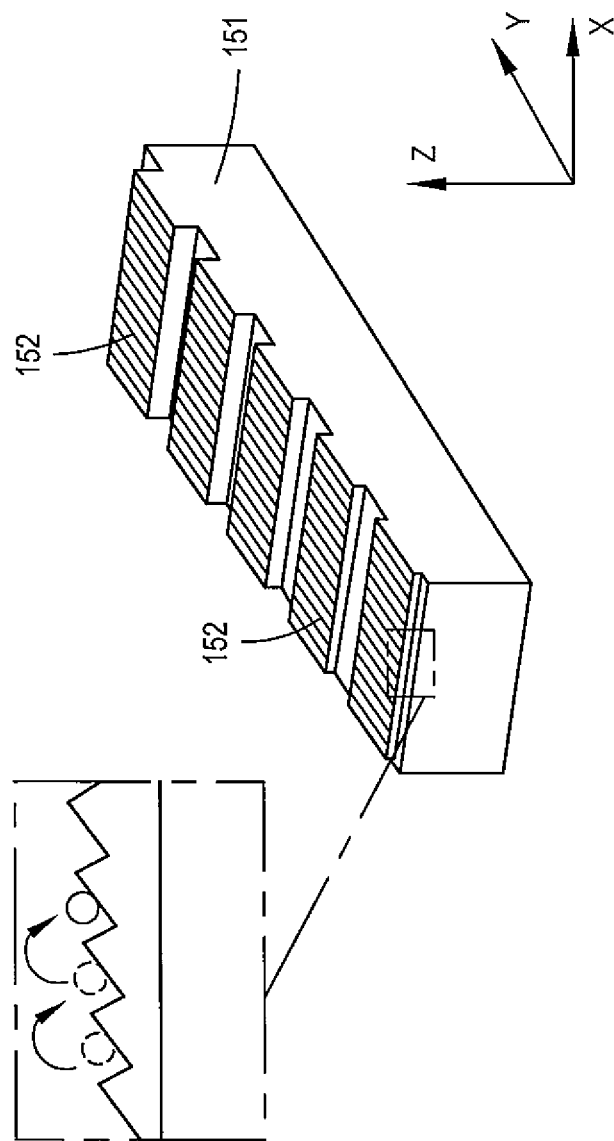
FIG. 2B is a three-dimensional view of the device of FIG. 1, that illustrates a variant in which the sorting channels are arranged in a sorting region according to a staircase profile.

Note, the sorting channels 152 may be essentially level with each other, as shown in the example of FIG. 2A. In variants, the sorting channels 152 could have a stair-like profile, as depicted in FIG. 2B. I.e., the channels 152 may possibly be successively arranged as rising steps, one after the other along the liquid propagation direction y in the sorting region. This helps in successively selecting smaller particles, which are then successively sorted via the ratchets of the sorting channels 152, the latter dimensioned in respect of sizes of particles meant to be sorted, see FIG. 1 or 2A for an illustration.

The design of the device 1 can be further optimized. For example, the sorting channels 152 can all be arranged on a same lateral side of the microchannel 10, as depicted in FIGS. 1-4. In that case, the barrier 13 can be implemented as a straight bar, inclined in the main microchannel 10. Having all sorting channels 152 on a same lateral side of the main microchannel 10 further reduces the footprint of the final device and simplifies the fabrication process. In more sophisticated variants, however, multiple sets of sorting regions may be arranged on one or each lateral side of the main microchannel 10, which would require multiple barriers, similar to barrier 13. However, if two sets of sorting channels 152 face each other on the lateral sides of the main channel, then the barrier 13 should have a U-profile (or a V-profile) to deflect large particles toward each sorting region.

As evoked earlier, the sorting direction of each sorting channel 152 is preferably parallel to the reference plane P and perpendicular to the flow direction y in the sorting region, to optimize the conditions in which particles are sorted. The upper wall of each sorting channel 152 preferably has a footprint of a×b μm$^2$, where a is between 10 μm and 30 μm, and b is between a and 50 μm. For example, each channel may have a footprint of 20×40 μm$^2$. The footprint of each channel 152 is measured parallel to the reference plane P and b is measured parallel to the sorting direction x of the channel. Unless otherwise indicated, all intervals given herein are assumed to include their endpoints.

In preferred embodiments, the device 1 further comprises two or more reservoirs 154, e.g., three, four or five reservoirs. The reservoirs 154 are preferably integrated in the device 1, as shown in FIGS. 1-4. In variants, the reservoirs can be connected to the sorting channels 152 via tubings and ports. In exemplary embodiments, the reservoirs 154 are in fluid communication with the sorting channels 152, such that particles sorted via the sorting channels 152 can be stored in the reservoirs 154, in operation. Preferably, each sorting channel 152 leads to a respective reservoir 154, whereby particles of distinct average sizes as sorted via the sorting channels 152 can be stored in respective ones of the reservoirs 154, in operation. And as mentioned earlier, a further reservoir (not shown) may possibly be provided upstream of the sorting region of the Brownian motor structure 15, for collecting larger particles that cannot enter the sorting region.

Preferred applications concern the sorting of virions whose sizes range from 20 nm to 100 nm, as discussed later in reference to another aspect. Thus, the barrier 13 and the Brownian motor structure 15 can be jointly designed (starting with their dimensioning) to allow particles to be sorted according to average sizes that are distributed between 20 nm and 100 nm.

Referring back to FIGS. 2A and 4, the device 1 preferably comprises a lid 50 covering each of the microchannel 10 and the sorting channels 152, though the lid may be added at a later fabrication stage, as mentioned earlier. The Brownian motor structure 15 is eventually formed by the sorting channels 152 and the portion of the lid 50 covering them, whereas the filter 12 is eventually formed by the electrostatic barrier 13 and the portion of the lid 50 covering it.

Thus, the inner surface of the lid 50 may face: the bottom wall of the microchannel 10, the top surface of the barrier 13, and the top surface of the sorting channels 152. As best seen in FIG. 4, the top surface of the barrier 13 and the top surfaces of the sorting channels 152 are recessed from the inner surface of the lid 50. Notwithstanding the apparent dimensions of the drawings (not to scale), the respective gaps shall typically be between 70 nm and 130 nm (for d–h) and 120 nm and 300 nm (for d–h$_s$), it being reminded that h$_s$ is smaller than h, preferably by a distance that is between 50 and 150 nm.

The lid 50 preferably consists of a glass layer. In variants, the lid 50 may for example be a polymer layer laminated on the microfluidic structures. In all cases, the device 1 may possibly comprise posts 14 arranged in the microchannel 10, to support the lid 50. The lid may further be glued or otherwise affixed to lateral features 20, 30, 40, to prevent leakage upon applying pressure to the liquid introduced in the channel 10.

The device 1 may comprise additional microfluidic structures, such as additional channels, capillary pumps, etc. The device is preferably realized as a chip, wherein all components and structures are patterned prior to sealing the structures with the lid 50. Microchannels 10 (apart from the ratchets of the sorting channels 152) are typically formed as grooves on a main surface of a layer of the device 1. The layer underneath is for example a substrate 11, or any layer that is sufficiently thick to provide mechanical stability to the device, although mechanical stability may be provided by means of an additional, underlying layer. In all cases, the layer on which microstructures are patterned may typically be an essentially planar object, such as a chip, a wafer or any such planar support. This layer may include various structures formed thereon, in particular microstructures and other microfluidic features, such as capillary pumps, loading pads, anti-wetting structures, flow resistors, vents, as well as electric circuits and contact pads. The flow path structure is preferably covered (sealed) by a glass layer or another light-permissive layer, allowing electrostatic repulsion, as well as detection and monitoring.

Preferably, a characteristic depth of such channels, chambers, vents and other structures is in the micrometer-length range, i.e., between 1 μm and 200 μm (and more preferably between 20 μm and 200 μm). Yet, some particular structures of the present devices may be in the nanoscale range (such as the gap d–h) or in the millimeter range (e.g., tubings, vents), the devices as a whole typically being in the centimeter range. Widths (e.g., as measured in-plane) for the microchannels 10 will typically be in the micrometer-length range too.

The topography can be produced by conventional nanofabrication techniques. For example, the microchannel 10, supported by either pillars or stripes, is defined in a first step by UV lithography. In a subsequent lithography step, the nanofluidic barrier (100 nm deep) is defined. Bosch etching of a silicon substrate defines the depth of the microchannel 10. The sorting ratchets can then be created using, e.g., thermal scanning probe lithography or focused ion beam milling.

For example, after anodic or fusion bonding to a Borofloat® glass coverslip, the fluidic channel can be filled with an electrolyte having a suitable Debye length. A polydimethylsiloxane (PDMS) microfluidics interface can be relied on to connect to a syringe pump to continuously inject the liquid sample.

Referring back to FIG. 1, another exemplary aspect is now described, which concerns a method of sorting particles (e.g., nanoparticles) according to their sizes (e.g., between 1 and 400 nm). This method and its variants are collectively referred to as "the present methods" in the following. Such methods have already been implicitly described in reference to the previous aspect; they are only briefly discussed in the following.

Essentially, such methods rely on a microfluidic device 1 as described herein. As discussed earlier, the device 1 comprises a main microchannel 10, a Brownian motor structure 15 with two or more sorting channels 152 having distinct ratchet topographies, and a filter 12 extending transversely to the microchannel 10. Any variant to the device 1 as described above may be used in the present methods.

According to such methods, a liquid containing particles is introduced in the microchannel 10 for said liquid to advance along the flow path defined by the channel 10, as illustrated by the lower arrow in FIG. 1. Owing to the design of the device 1, particles in the liquid are filtered by the filter 12 including the barrier 13 and the lid 50, subject to their sizes. As a result, smaller particles 71 of the liquid pass downstream of the filter 12 in the flow path, together with liquid passing the filter. On the contrary, larger particles 72 of the liquid are directed to the Brownian motor structure 15.

In addition, an oscillating electric field is applied across the sorting channels 152 to power the Brownian motors. As a result, the (larger) particles 72 that manage to reach the sorting region of the Brownian motor structure 15 are sorted out, according to sizes thereof, via the sorting channels 152. All steps of the present methods are preferably performed concomitantly, so as to allow a continuous process of concentration and sorting of particles.

As discussed earlier, the filter 12 formed by the barrier 13 and the lid 50 is preferably configured as an electrostatic barrier, involving a slanted barrier 13, which has an average height h ensuring a residual gap d−h, whereby the larger particles 72 are electrostatically deflected by the barrier 13 toward the Brownian motor structure 15 while liquid advances along the flow path, as depicted by arrows in FIG. 1.

In embodiments, the present methods further comprise applying a pressure to the liquid advancing along the flow path, so as for the liquid to reach a flow speed that is, e.g., between 5 and 20 μm/s in the sorting region of the Brownian motor structure 15, across the sorting channels 152 (i.e., along y). That is, a carefully controlled input pressure may, together with the design of the device 1, allow a sufficiently slow liquid flow across the sorting channels 152, so as not to impair the sorting of particles via the Brownian motor structures 15. For example, by applying a pressure of approximately 1 bar to liquid introduced in the main microchannel 10 of a device 1 such as shown in FIGS. 1-4, a flow speed of approximately 1 mm/s can be achieved across the barrier 13, yielding a throughput of approximately 4 μl/h, while a flow speed of approximately 10 μm/s can be achieved in the sorting region, which is preferable for sorting particles in the transverse direction x. More generally, flow speeds between 5 and 20 μm/s can be relied on, by applying input pressures between 0.5 and 2 bars.

The sorted particles can be collected from reservoirs 154 in fluid communication with the sorting channels 152, i.e., either indirectly connected via tubings and ports or directly integrated in the chip 1. And, as said, the method can advantageously be carried out so as to collect viruses having average sizes distributed between 20 nm and 100 nm.

The above embodiments have been succinctly described in reference to the accompanying drawings and may accommodate a number of variants. Several combinations of the above features may be contemplated. For example, in preferred embodiments, the device is designed as a multichannel microfluidic chip that can separate in sizes and detect virions whose sizes are between 20-100 nm, with a detection sensitivity below 1 aM, in less than 1 hour in real world conditions. An electrostatic barrier deflects analytes 72 towards the sorting ratchet region of the Brownian motor structure 15, up-concentrating the solution. A series of 20×40 μm$^2$ ratchets in the sorting channels 152 are arranged in the direction y of the flow, which retain particles of progressively smaller size, directing them toward respective reservoirs 154. The device has, as a whole, a length of 1 cm (measured along y), and once a pressure of 1 bar is applied, a flow speed of 1 mm/s is achieved across the barrier, while the flow speed in the ratchet region is of about 10 μm/s, ideal for sorting.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A microfluidic device comprising:
a microchannel defining a flow path;
a Brownian motor structure comprising two or more sorting channels having distinct ratchet topographies, the Brownian motor structure in fluid communication with the microchannel; and
a filter extending transversely to the microchannel, the filter configured to filter particles, subject to sizes thereof, in a liquid advancing along the flow path, whereby smaller particles of said liquid can pass downstream of the filter in the flow path, and larger particles of said liquid are directed to the Brownian motor structure by an electrostatic effect caused by a surface of a barrier and a surface of a lid of the microfluidic device, the larger particles to be sorted out according to sizes thereof via the sorting channels.

2. The device according to claim 1, wherein
the microchannel comprises a bottom wall extending in a reference plane and has an average depth d, and
the filter comprises the barrier that
extends from said bottom wall,
is inclined relative to a direction y of propagation of liquid defined by the flow path in the microchannel, and
has an average height h, where h<d, each of the average height h and the depth d measured from said reference plane in a direction z perpendicular to said reference plane.

3. The device according to claim 2, wherein
an average plane of the sorting channels is offset relative to said reference plane by a distance $h_s$ that is smaller than the height h of the barrier, said distance $h_s$ measured along said direction z, from said reference plane.

4. The device according to claim 2, wherein
a flow resistance of the Brownian motor structure is larger than a flow resistance of the barrier, so that a flow speed of liquid in the microchannel is larger than a flow speed of liquid in the Brownian motor structure.

5. The device according to claim 2, wherein
the sorting channels extend, each, parallel to said reference plane, and are arranged one after the other along a direction of propagation of liquid in the Brownian motor structure.

6. The device according to claim 5, wherein
said sorting channels are arranged on a same lateral side of the microchannel.

7. The device according to claim 5, wherein
said sorting channels define respective sorting directions along which particles are moved, and
said sorting directions are parallel to each other and furthermore parallel to said reference plane.

8. The device according to claim 7, wherein
said sorting directions are, each, perpendicular to a direction of propagation of the liquid in the microchannel.

9. The device according to claim 7, wherein
each of said sorting channels comprises an upper wall forming several contiguous steps, each having an asymmetric profile along a respective one of the sorting directions of said sorting channels.

10. The device according to claim 9, wherein
the upper wall of each of said sorting channels has a footprint of a×b μm$^2$, where a is between 10 μm and 30 μm, and b is between a and 50 μm,
said footprint is measured parallel to said reference plane, and
b is measured parallel to said sorting directions.

11. The device according to claim 1, wherein
the device further comprises two or more reservoirs in fluid communication with the two or more sorting channels, respectively, whereby particles of distinct average sizes as sorted via the sorting channels can be stored in respective ones of the reservoirs.

12. The device according to claim 2, wherein
the device further comprises the lid covering each of the microchannel and the sorting channels, such that the sorting channels and a portion of the lid covering them form the Brownian motor structure, and the barrier and a portion of the lid covering it form an electrostatic barrier for said larger particles.

13. The device according to claim 12, wherein
the device further comprises posts arranged in the microchannel, to support the lid.

14. The device according to claim 13, wherein:
an inner surface of the lid faces each of the bottom wall of the microchannel, a top surface of the barrier, and a top surface of the sorting channels; and
the top surface of the barrier and the top surfaces of the sorting channels are recessed from said inner surface of the lid by distances that are between 70 nm and 130 nm and 150 nm and 250 nm, respectively.

15. A method of sorting particles according to their sizes, the method comprising:
providing a microfluidic device comprising,
a microchannel defining a flow path,
a Brownian motor structure comprising two or more sorting channels having distinct ratchet topographies, and
a filter extending transversely to the microchannel;
introducing a liquid containing particles in the microchannel for said liquid to advance along the flow path, whereby particles in the liquid are filtered by the filter, subject to their sizes, such that smaller particles of the liquid pass downstream of the filter in the flow path, and larger particles of the liquid are directed to the Brownian motor structure by an electrostatic effect caused by a surface of a barrier and a surface of a lid of the microfluidic device; and
applying an oscillating electric field across the sorting channels for said larger particles to be sorted out according to sizes thereof via the sorting channels.

16. The method according to claim 15, wherein
the microchannel of the device provided comprises a bottom wall extending in a reference plane and has an average depth d, and
the filter comprises the barrier that extends from said bottom wall, is inclined relative to a direction y of propagation of liquid defined by the flow path in the microchannel, and has art average height h, where h<d, each of the average height h and the depth d measured from said reference plane in a direction z perpendicular to said reference plane, whereby said larger particles are electrostatically deflected by the barrier toward the Brownian motor structure while the liquid introduced in the microchannel advances along the flow path.

17. The method according to claim 15, wherein
said sorting channels extend, each, parallel to a reference plane defined by a bottom wall of the microchannel, and one after the other along a direction of propagation of the liquid in the Brownian motor structure, and
the method further comprises applying a pressure to the liquid advancing along the flow path, so as for the liquid to reach a flow speed that is between 5 and 20 □m/s across the sorting channels, along the direction of propagation of the liquid in the Brownian motor structure, upon applying said pressure.

18. The method according to claim 17, wherein
the pressure applied to the liquid advancing along the flow path is between 0.5 and 2 bars.

19. The method according to claim 15, wherein
the method further comprises collecting the sorted particles from reservoirs in fluid communication with the sorting channels.

20. The method according to claim 15, wherein
the method is carried out so as to collect viruses having average sizes between 20 nm and 100 nm.

* * * * *